United States Patent [19]

Fukuoka et al.

[11] Patent Number: 5,662,162
[45] Date of Patent: Sep. 2, 1997

[54] HEAT EXCHANGING APPARATUS

[75] Inventors: Mikio Fukuoka, Bisai; Yoshifumi Aki, Kariya, both of Japan

[73] Assignee: Nippondenso Co., Ltd., Kariya, Japan

[21] Appl. No.: 507,939

[22] Filed: Jul. 27, 1995

[30] Foreign Application Priority Data

Jul. 28, 1994 [JP] Japan .................... 6-176926

[51] Int. Cl.[6] ................................ F28D 1/053
[52] U.S. Cl. .................. 165/41; 165/78; 165/69; 165/149
[58] Field of Search ............. 165/76, 78, 69, 165/149, 153, 173, 41, 67; 237/12.3 A, 12.3 B

[56] References Cited

U.S. PATENT DOCUMENTS

| | | | |
|---|---|---|---|
| 3,113,615 | 12/1963 | Huggins | 165/149 |
| 3,265,126 | 8/1966 | Donaldson | 165/149 |
| 4,036,288 | 7/1977 | Neveux | 165/69 |
| 4,328,859 | 5/1982 | Bouvot | 165/78 |
| 4,465,124 | 8/1984 | Jacquet et al. | 165/67 |
| 4,533,081 | 8/1985 | Forsting et al. | 237/12.3 B |
| 5,219,017 | 6/1993 | Halstead et al. | 165/41 |

FOREIGN PATENT DOCUMENTS 55-10072  1/1972  Japan .

*Primary Examiner*—Allen J. Flanigan
*Attorney, Agent, or Firm*—Cushman, Darby & Cushman IP Group of Pillsbury Madison & Sutro LLP

[57] ABSTRACT

A heater core of a construction which is easy to produce by a molding process, while providing a desired sealing effect with respect to its casing. The heater core 20 is formed by a pair of tanks 28 and a heat exchanging section 27 arranged between the tanks 28. The heat exchanging section 27 is formed by a pair of top and bottom support plates 33 and stack of heat exchanging tubes 31 and fins 32 arranged alternately. The top and bottom supporting plates 33 have a width with is equal to the width of tanks 28, so that end surfaces of the support plates 33 are located on the same plane with respect to outer surfaces of the tank 28 in the direction of the flow of the air contacting with the heat exchanging section 27.

12 Claims, 11 Drawing Sheets

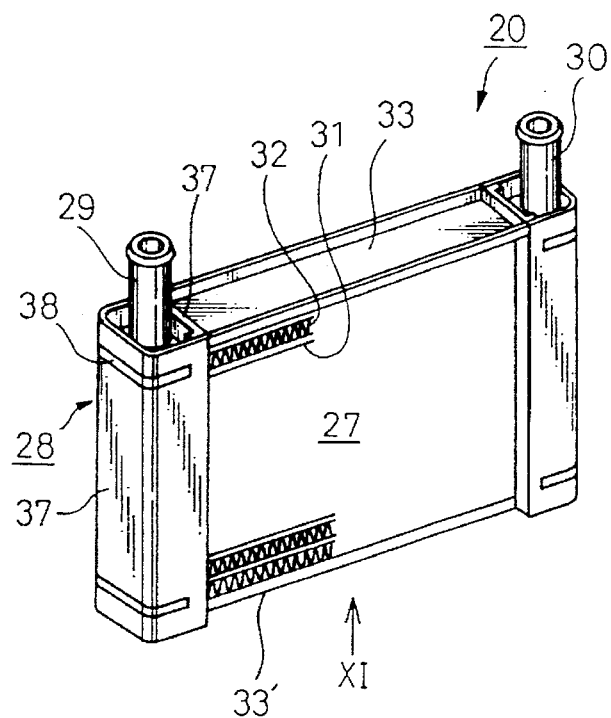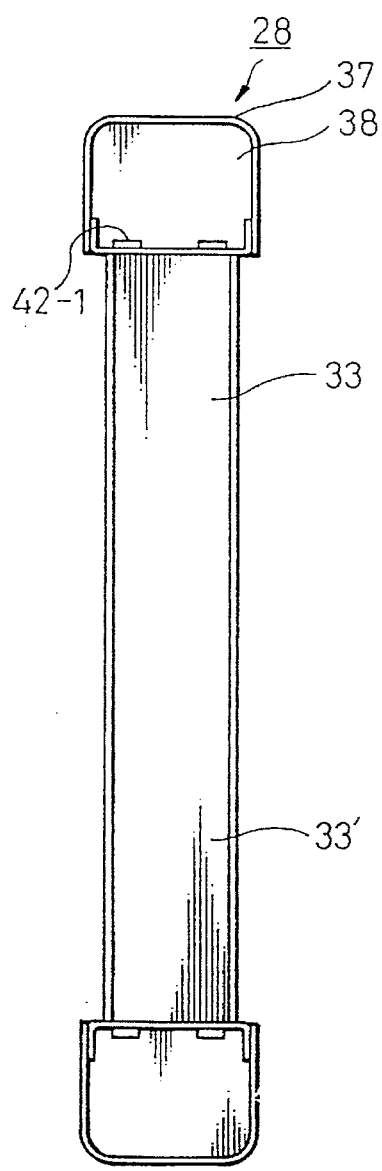

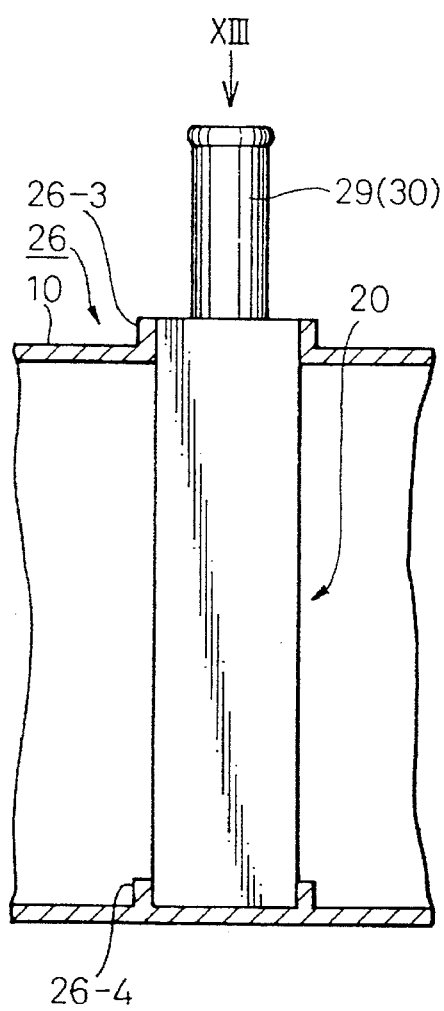
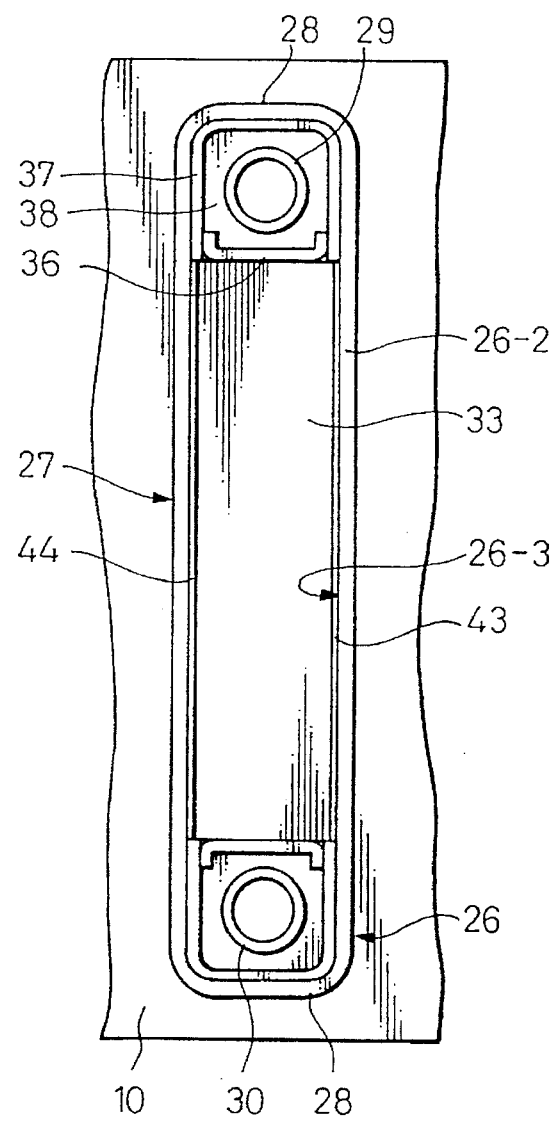

HEAT EXCHANGING APPARATUS

BACKGROUND OF THE INVENTION

1. Field of the Invention

The present invention relates to a heat exchanging apparatus, which is, for example, used for a heater core arranged in an air duct in an air conditioning system for an automobile.

2. Description of Related Art

A heat exchanging apparatus for a heater core in an air conditioning system for an automobile is constructed by a pair of space tanks and a heat exchanging section arranged between the tanks. The heat exchanging section is constructed by a plurality of flattened heat exchanging tubes and fins which are alternately arranged, and a pair of vertically spaced support plates arranged at the top and bottoms of the heat exchanging section. The flattened tubes have a width which is smaller than a diameter of the tanks, while the tanks have openings spaced along the length or height of the tanks. The tubes are, at both ends, inserted to the respective openings in the tanks, so that a communication of a heating medium is obtained between the tanks and the heat exchanging tubes. Furthermore, a casing is provided, which has a cross sectional shape of an elongated rectangular shape. The heater core is inserted to the casing, while gaps are left between the casing and the core. In order to obtain a sealed structure, packing members are inserted to the gaps, thereby preventing air from leaking via the gaps.

In order to reduce a production cost, Japanese Examined Utility Model No. 55-10072 proposes a sealed construction between the heat exchanging unit and the case without use of the packing members. In this patent, the tanks and the heat exchanging section have the same thickness, which makes the construction of the upper portion of the heat exchanging apparatus simple. Furthermore, the heat exchanging tubes are firmly fitted to the opening of the casing, thereby providing a sealed structure.

Furthermore, in the prior art, the shape of the heater core viewed from the above is made, with respect to the shape of an opening in the casing, so that the heater core is inserted to the casing via the opening in order to obtain a desired sealing function between the heater core and the casing. However, in the prior art, the shape of the heater core viewed from the above is relatively complicated, which requires that the shape of the opening has a corresponding complicated shape. As a result, a production of the casing, by molding and with high efficiency, becomes difficult.

SUMMARY OF THE INVENTION

An object of the present invention is to provide a construction capable of obtaining an increased efficiency during the molding, while maintaining an increased sealing ability.

According to the present invention, a heat exchanging system is provided, comprising:

a casing defining a passageway for a flow of air and an opening of a closed profile, said opening being opened laterally with respect to the a passageway, and;

a heat exchanger for receiving therein a heat exchanging medium, the heat exchanger inserted into the casing via said opening to a position where the air flow is contacted with the heat exchanger, which allows heat exchange to occur between the heat exchanging medium and the air flow in the duct;

the heat exchanger comprising a pair of spaced apart tanks, a stack of heat exchanging tubes and fins arranged alternately, and support plates at the top and bottom of the stack;

said tanks as well as said top supporting plate being in a closely sealed relationship with respect to the opening, while the casing has a portion for firmly fixing said bottom supporting plate;

said tanks and the support plate, at least at the top, have portions which form a pair of straight lines extending in the direction of the length of the tube and spaced in the direction of the flow of the air in the passageway.

BRIEF DESCRIPTION OF ATTACHED DRAWINGS

FIG. 10 is a perspective view of a modification to a heater core.

FIG. 11 is a bottom plan view of the heater core taken along an arrow XI in FIG. 10.

FIG. 12 is similar to FIG. 3 but illustrates a modification.

FIG. 13 is a top plan view taken along an arrow XIII in FIG. 12.

DESCRIPTION OF THE PREFERRED EMBODIMENTS

Now, embodiments of the present invention will be explained with reference to attached drawings.

Figure 1:
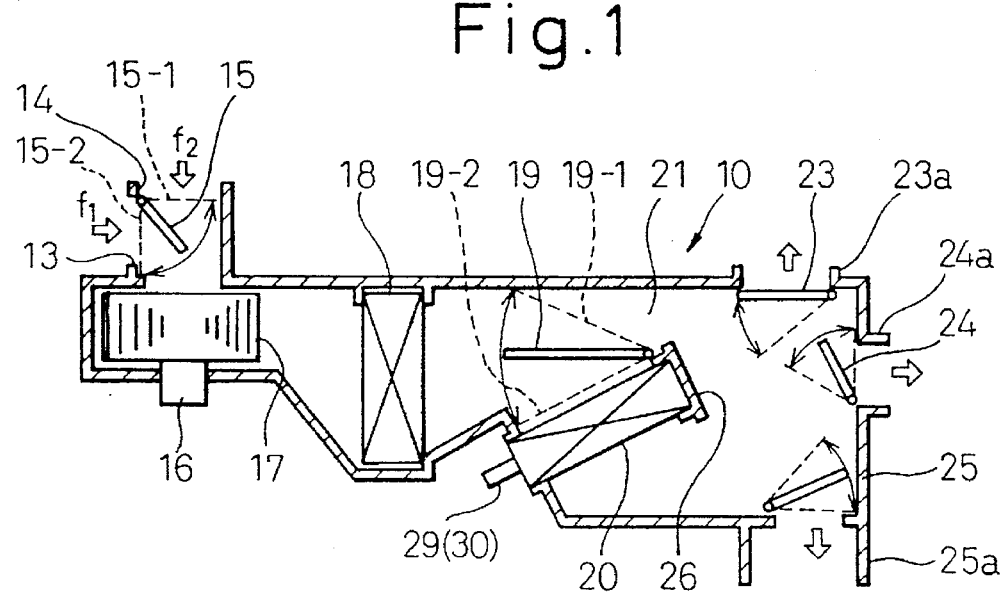
FIG. 1 is a schematic cross sectional view of an air conditioning system for an automobile having a heater core constructed according to the present invention.

FIG. 1 illustrates an air conditioning apparatus for an automobile. The system includes a casing or duct 10 made of a plastic material such as polypropylene, in which a passageway for an air flow is formed. The casing 10 has, at its upstream end, an inner air inlet 13 for an introduction of air form a cabin and an outer air inlet 14 for an introduction of air form an atmosphere outside the cabin. A switching damper 15 is moved between a first position 15-1, where the inner air inlet 13 is opened which allows the inner air to be introduced into the duct 10 as shown by an arrow $f_1$ and a section position 15-2, where the outer air inlet 15 is opened which allows the outside air to be introduced into the duct 10 as shown by an arrow $f_2$. The switching damper 15 is connected to a actuator (not shown) for obtaining the switching movement of the damper 15 between the first and second positions 15-1 and 15-2.

A blower 17 is arranged in the duct 10 at a location downstream from the switching damper 14. The blower 17 is connected to an electric motor 16 so that a rotating movement of a rotating shaft (not shown) of the motor 16 is transmitted to the blower 17, where causes a flow of air to be generated from the inner air inlet 13 or the outer air inlet, 14, which is opened by the damper 15, to an evaporator 18 arranged in the duct 10. The evaporator 18 is located in a refrigerating system, which includes, in addition to the evaporator 18, a compressor (not shown), a condenser (not shown) and an expansion valve (not shown). In a well known manner, a compressed gaseous refrigerant from the compressor is introduced into the condenser, whereat the refrigerant is liquidized. Then, at the expansion valve, the pressure of the refrigerant is reduced. The refrigerant of reduced pressure is evaporated at the evaporator 18 and is returned into the compressor for repetition of the refrigerating cycle. The evaporator 18 is arranged to be contacted with the air flow from the blow 17, so that a heat exchange occurs between the air contacting with the evaporator 18 and the refrigerant in the evaporator 18. As a result, the air flow is cooled by a latent heat for evaporation at the evaporator 18.

At a location downstream from the evaporator 18, an air mix damper 19 and a heater core 20 are provided. The heater core 20 is arranged to contact with the air flow from the evaporator 18 and is formed with an inlet pipe 29 for receiving a hot water from a cooling system (not shown) of an internal combustion engine and an outlet pipe 30 for returning the hot water to the cooling system. As a result, heat exchange occurs between an air flow from the evaporator 18 and the hot air in the heater core 20, thereby heating the air flow. The air mix damper 19 can be moved between a first position 19-1 where the heater core 20 is opened, and a second position 19-2 where a by-pass passageway 21 is opened. Furthermore, the air mix damper 19 can be located at a desired position between the first and second positions 19-1 and 19-2. As a result, a continuously varied ratio can be obtained between the amount of the air introduced into the heater core 20 and the amount of the air introduced into the by-pass passageway 21. As a result, when the heated air from the heater core 20 and the by-passed air from the by-pass passageway 21 are combined, the temperature of the combined air is controlled continuously in accordance with the degree of the opening of the air mix damper 19. The duct 10 is, at its downstream end, formed with a defroster outlet 23a, an upper outlet 24a and a lower outlet 25a controlled by a defroster damper 23, an upper outlet damper 24 and a lower outlet damper 25, respectively.

Figure 20:
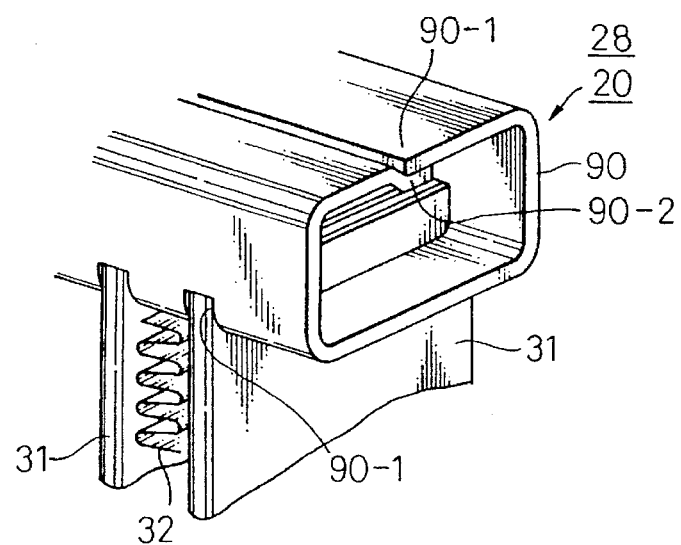
FIG. 20 is a partial perspective view of a modification to a tank.

Now, a detail of the construction of the heater core 20 according to the present invention will be explained. The duct 10 is formed with a casing section 25, to which the heater core 20 is inserted, while allowing the air flow to be contacted with the heater core 20. In FIG. 20, the heater core 20 is made of aluminum based alloy plate, on which a coating of a brazing metal (brazing material) is formed. The heater core 20 comprises a heat core section 27, a pair of spaced tanks, 28, an inlet pipe 29 connected to the one of the tanks 28 (first tank) and an outlet pipe 30 connected to the other tank 28 (second tank). In the conventional manner, the inlet pipe 29 is connected to a cooling system (not shown) of an internal combustion engine, so that hot coolant from the engine cooling system is introduced, via the inlet pipe 29, into the one of the tanks 28. The hot water from the inlet first tank is passed through the heater core section 27, where heat exchange occurs between the hot water passing through the heater core section 27 and an air flow contacting with the heater core section 27. The engine cooling water after the heat exchange is introduced into the other tank 28 and is returned to the engine cooling system via the outlet pipe 30.

The heater core section 27 is constructed by a plurality of vertically spaced flattened heat exchanging tubes 31 and corrugated fins 32, which are alternately arranged, and a pair of vertically spaced top and bottom support plates 33. The heat exchanging tube 31 has a substantially identical width along the entire length of the tube 31. In the first embodiment, the top and bottom support plates 33 have a width E (FIG. 6) which is identical as the width $e$ of the tank 28 in the direction of the air flow with respect to the heater core 20 as shown by an arrow B in FIG. 2. Contrary to this, the heat exchanging tubes 31 and the fins 32 have a width $a$ which is smaller than the width e of the tank 28 as shown in FIG. 3.

Figure 2:
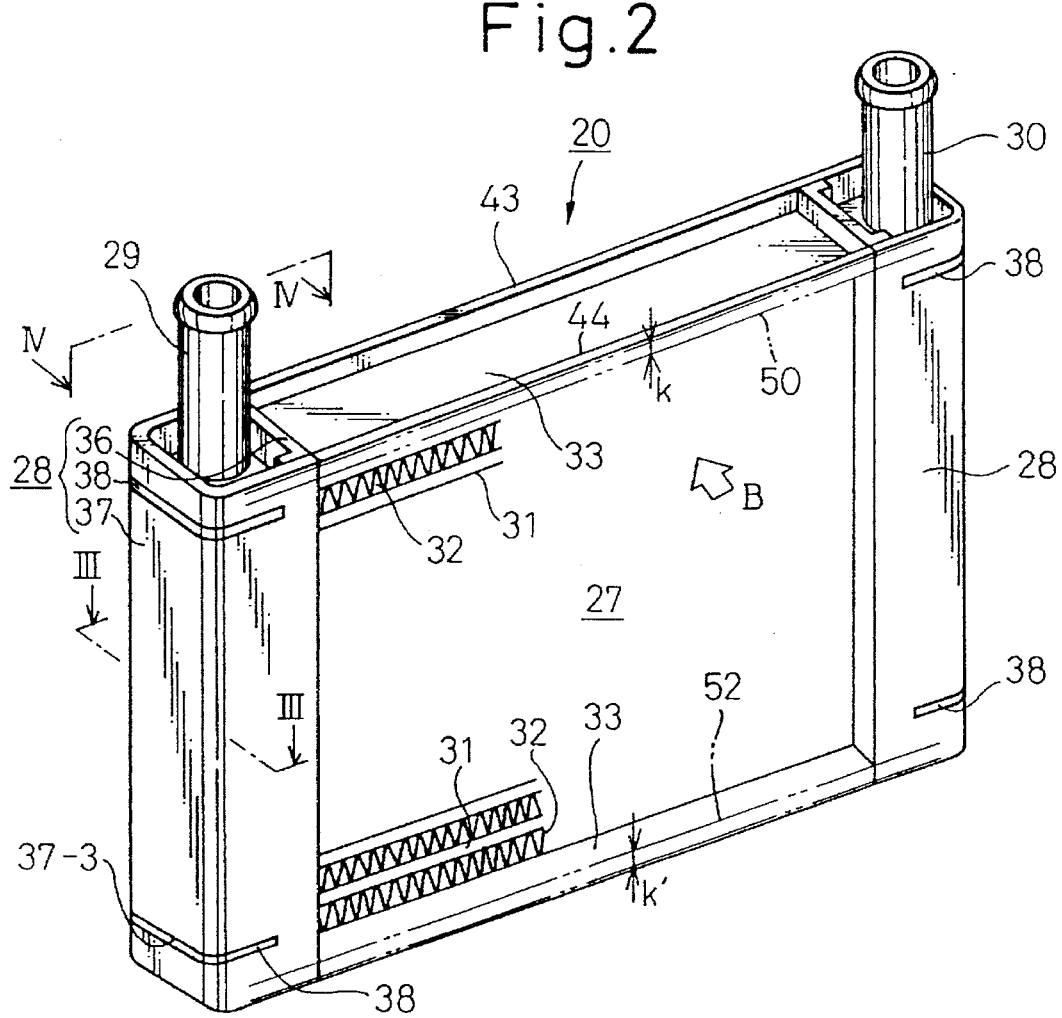
FIG. 2 is a schematic perspective view of a heater core in an embodiment of the present invention.
Figure 3:
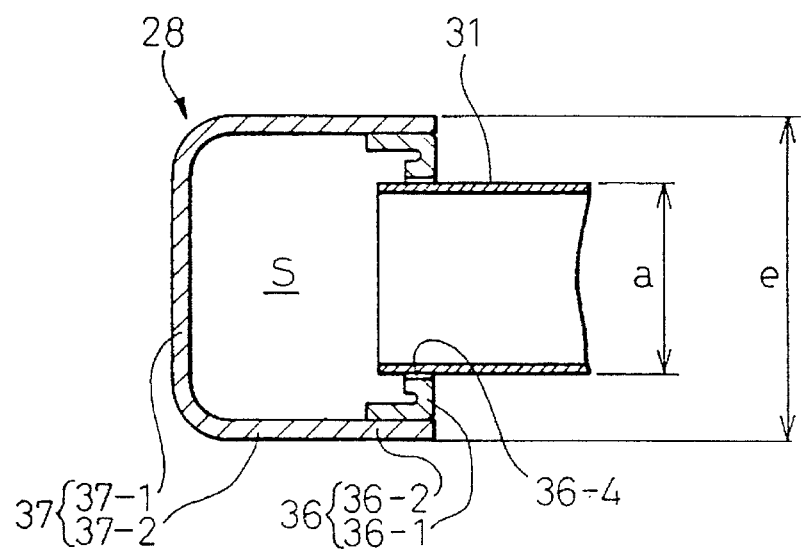
FIG. 3 is a cross sectional view of a tank taken along a line III—III in FIG. 2.

As shown in FIG. 2, each of the tanks 28 is constructed by a seat plate 36, to which a stack of the heat exchanging tubes 31 are connected, a tank cap 37, to which the seat plate 36 is fitted, and a pair of end plates 38 spaced in the direction of the stack. The inlet pipe 29 and the outlet pipe 30 are connected to the respective upper end plates 38 of the tanks 28. As shown in FIG. 3, the seat plate 36 of a substantiality U-cross sectional shape includes a bottom plate portion 36-1 extending along its length and a pair of spaced upright side wall portions 36-2, between which the bottom plate portion 36-1 extends horizontally. The tank cap 37 is also of a substantiality U-cross sectional shape and includes a tope plate portion 37-1 and a pair of spaced upright side wall portions 37-2 between which the top plate portion 37-1 extends. As shown in FIG. 3, in order to assemble the tank 28, the seat plate 36 is fitted to the tank cap 37 in such a manner that U-shaped recesses face each other, thereby forming a space S between the members 28 and 30, so that the side walls 36-2 and 37-2 are in contact with each other. Furthermore, the tank cap 37 is, at top and bottom ends, formed with slits 37-3, to which the end plates 38 are fitted, thereby obtaining the tank 28 as assembled. In this assembled condition, the space $\underline{S}$ is closed at its top and bottom by the support plates 38, thereby allowing the hot water to be held in the space $\underline{S}$.

The seat plate 36 is formed with a plurality of slits (tube insertion openings) 36-4 spaced along the length of the seat plate 36. Spacing between the slits 36-4 corresponds to the spacing between heat exchanging tubes 31. Each slit 36-4 extends along a partial width of the bottom plate portion 36-1. The flattened heat exchanging tubes 31 are inserted to the respective slits 36-1. See also FIGS. 3 and 4.

Figure 4:
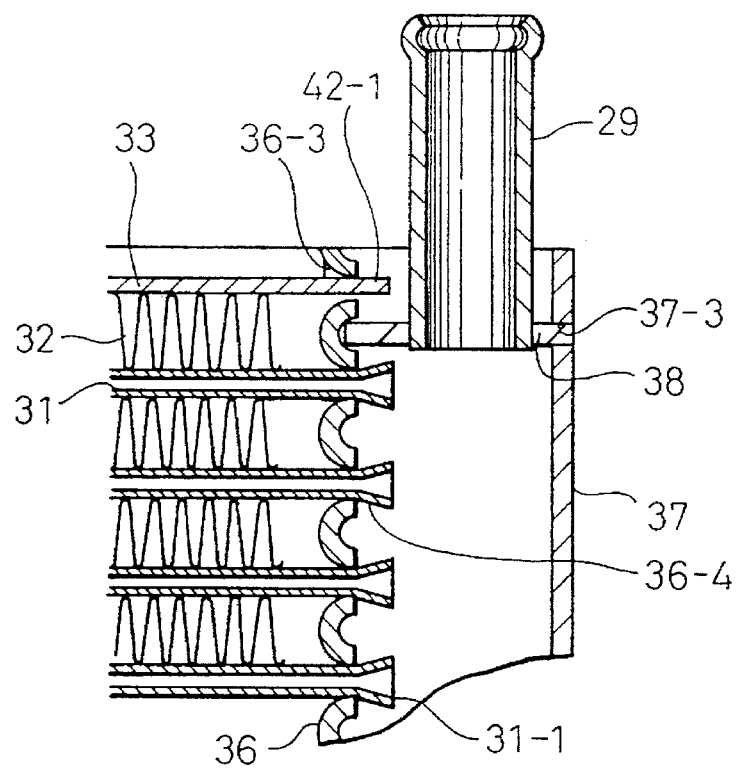
FIG. 4 is a cross sectional view illustrating the connection of heat exchanging tubes with respect to the tank taken along a line IV—IV in FIG. 2.
Figure 5:
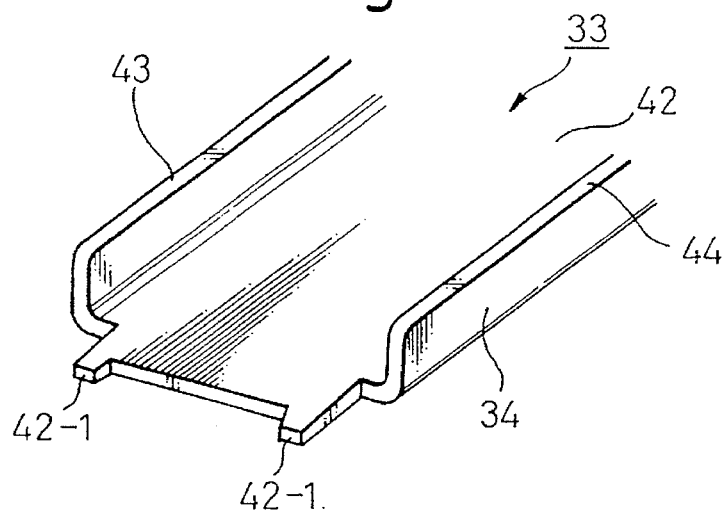
FIG. 5 is a perspective view of an end of a supporting plate of the heater core.

The connection of the heater core section 27 with respect to the tanks 28 will now be more fully explained. As shown in FIG. 5, the support plate 33 of the heater core section 27 is an elongated member of a U-cross sectional shape. Namely, the support plate 33 is formed with a bottom wall portion 42 extending along the length and a pair of side walls 43 and 44, between which the bottom wall portion 42 is arranged. At ends spaced along the length, the bottom wall portion 42 is formed with spaced lugs 42-1 which are inserted to a slit 36-3 in the seat plate 36 of the tank 28 as explained with reference to FIG. 4.

Figure 6:
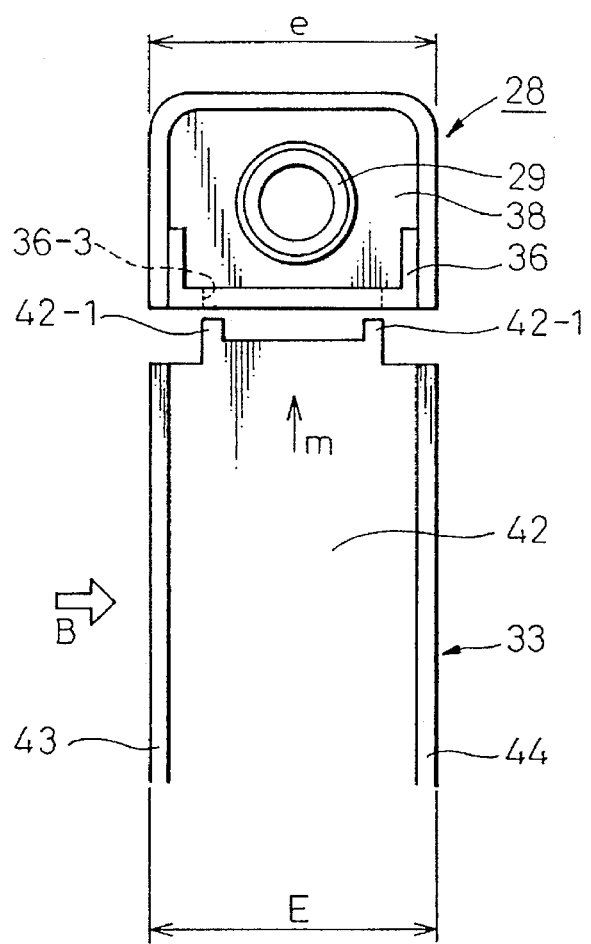
FIG. 6 is a top plan view illustrating a condition before the supporting plate is connected to the tank.

As shown in FIG. 6, the support plate 33 has a uniform thickness E in the direction of the flow of the air which is equal to the thickness e of the tank 28. In FIG. 6, when viewed from the above, the tank 28 has a cross sectional shape of substantially regular rectangular shape, while the support plate 33 of the heater core section 27 has a substantially elongated rectangular shape of the same width as the width of the tanks 28. Thus, the heater cores 20 are, when viewed from the above, formed in an elongated rectangular shape.

Figure 7:
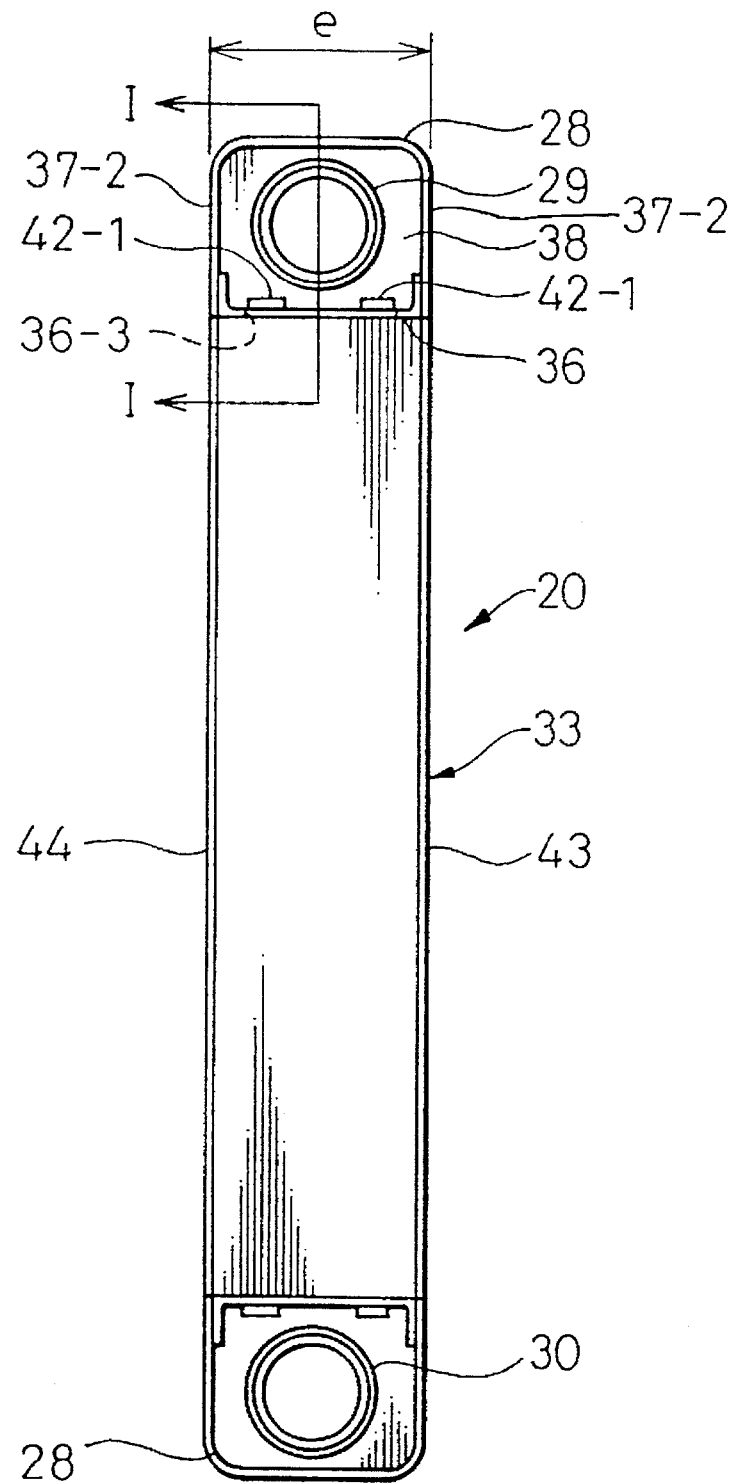
FIG. 7 is a top plan view of the heater core after assembly.

Now, the process of assembly of the heater core 20 will be explained. First, on the bottom support plate 33, a corrugated fin 32 and then a heat exchanging tube 31 are placed. These steps are repeated to obtain a stack of the fins 32 and the tubes 31 alternately arranged, and finally the top support plate 33 is placed on the top of the stack, in order to obtain a sandwich structure of the stack of the fins 32 and the tubes 31 sandwiched between the top and bottom support plates 33. Then, a wire is wound around the sandwich structure so that a tightening force from the wire is applied, via the top and bottom plates 33, to the stack of the fins 32 and the tubes 31. As a result, a provisional assembly of the heater core section 27 is obtained. Then, the seat plates 36 of the tanks 20 are connected to the provisional assembly of the heater core section 27 in such a manner that the ends of the tubes 31 are fitted to the corresponding slits 36-4 in the seat plates 36 and the lugs 42-1 of the support plates 33 are fitted, as shown by an arrow in FIG. 6, to the corresponding slits 36-3 in the seat plate 36. FIG. 7 shows a state where the lugs 42-1 are fitted to the slits 36-3. Then, the inserted ends 31-1 are widened as shown in FIG. 4, thereby preventing the tubes 31 from being withdrawn from the tanks 28. Then, the tank cap 37 is fitted to the seat plate 36 as shown in FIG. 3. Then, end plates 38 are fitted to the respective slits 37-3 on the tank cap 37. Finally, the pipes 29 and 30 are fitted to the corresponding top end plates 38 of the respective tanks 28. Thus, a provisionally assembled state of the heater core 20 is obtained.

Then, the provisional heater core assembly is introduced into a heating furnace (not shown), which causes the brazing material coated on the surface of the members to be molten. Thus, after cooling, the solidified brazing material firmly connect the tubes 31, the fins 32, the support plates 33, the seat plates 36, the tank caps 37, the end plates 38, and the heat exchanging pipes 29 and 30 with each other, thereby obtaining the heater core 20 as finally assembled.

Figure 8:
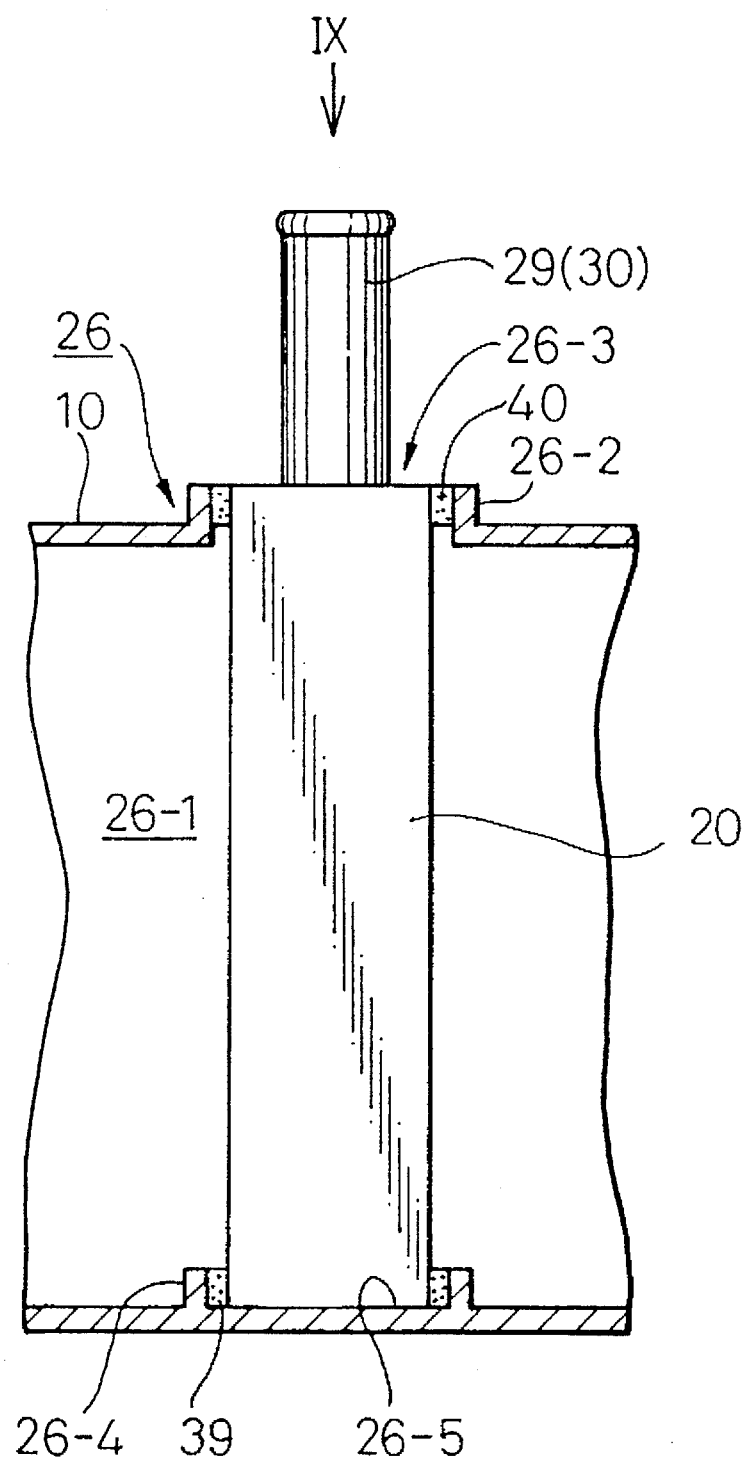
FIG. 8 is an enlarged view of a part of FIG. 1 where the heater core is connected to an air duct.
Figure 9:
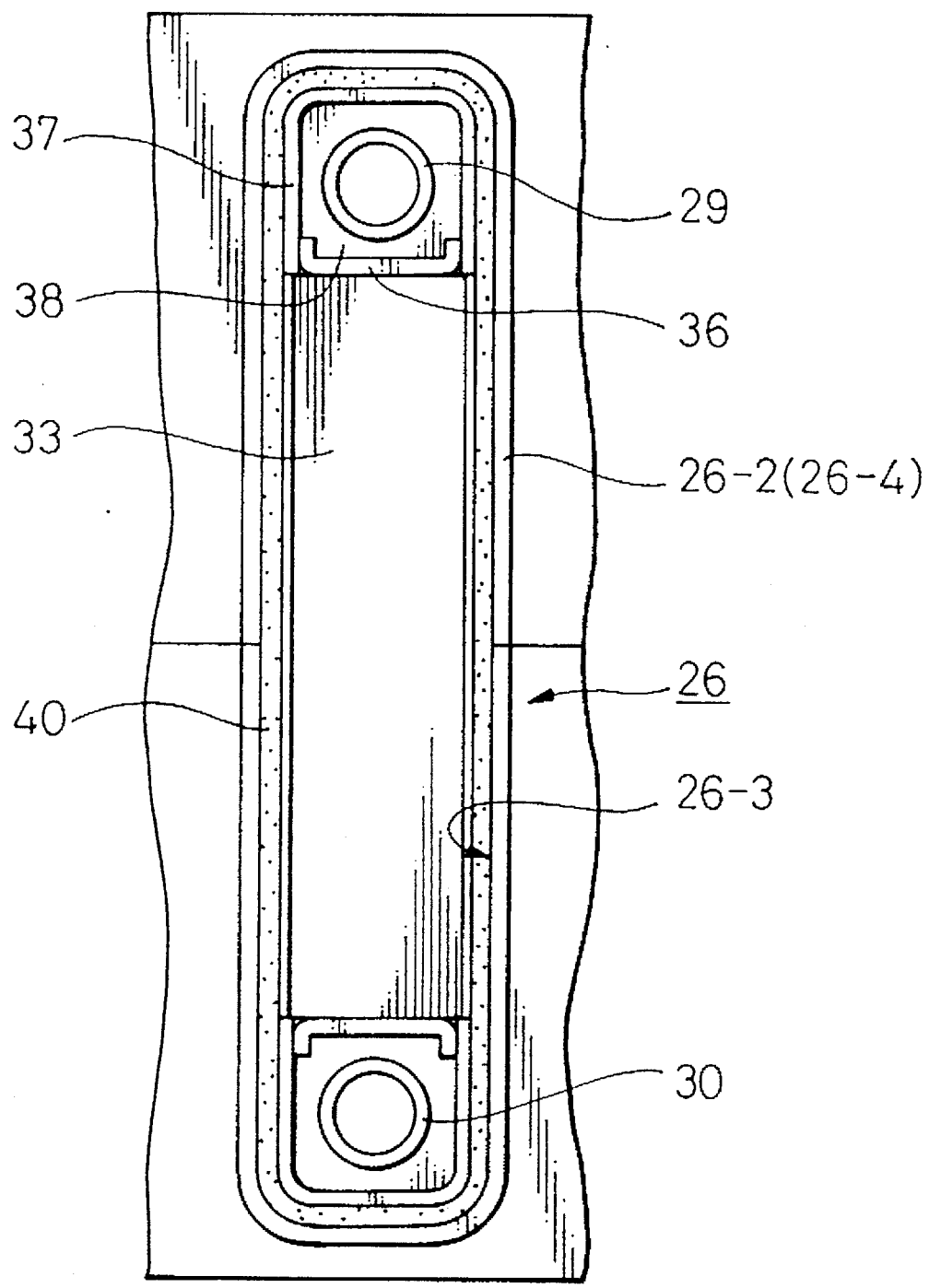
FIG. 9 is plan view taken along an arrow IX in FIG. 8.

Now, the connection of the heater core to the mounting section 26 of the duct 10 of the air conditioning system for an automobile will be explained. As shown in FIG. 8, the mounting section 26 is has an air passageway 26-1 for the air to be subjected to a heat exchange with the hot air from the internal combustion engine. The mounting section 26 is formed with a tubular lip shaped first supporting portion 26-2 having an insertion opening 26-3 opened laterally to the air passageway 26-1, which allows the heater core 20 to be inserted to a desired position with respect to the air passageway 26-1. At a location opposite to the first supporting lip 26-2, the mounting section 26 is formed with a tubular lip shaped second supporting portion 26-4 having an insertions recess 26-5 for receiving a bottom end of the heater core 20 when it is inserted. The cross section of opening 26-3, as well as of the recess 26-5, is an elongated rectangular shape similar to, but slightly larger than, that of the heater core 20. As a result, the heater core 20 is mounted to the box shaped mounting section 26 as shown in FIG. 8 and 9 in such a manner that the heater core 20 is, at its bottom, received by the second mounting section 26-4 via an annular sealing member 39 and is, at its top end, received by the first mounting section 26-3 via an annular sealing member 40 and that the pipe 29 and 30 are extended out of the casing 26. These sealing members 39 and 40 are made of a suitable plastic material, such as a polyethylene, which is suitable for obtaining a fluid tight connection of the heater core 20 to the mounting section 26 as shown in FIG. 9. As a result, the air is prevented from leaking through the space between the casing and the heater core 20. The sealing members 39 and 40 may be bound to the heater core 20 by an adhesive prior to the insertion of the heater core 20 to the heater core mount section 26.

In the construction of the first embodiment of the present invention, each of the side walls 43 and 44 of the support plate 33 is located along a straight line with respect to the side wall 37-2 of the tank cap 37. Such a straight arrangement makes the shape of the heater core to be a simple rectangular shape when viewed from above. In other words, any stepped portion in the prior art is eliminated, thereby simplifying the construction for obtaining a sealing, thereby increasing a productivity during a production. Namely, the sealing member 40 contacts the surfaces of the side walls 43 and 44 and tank caps 37 along a straight band of a predetermined thickness k as shown by phantom lines 50 in FIG. 2. Similarly, the sealing member 39 contacts the surfaces of side walls 43 and 44 of the bottom support plate 33 and the tank caps 37 along a straight band of a predetermined thickness k' as shown by phantom lines 52 in FIG. 2. According to the present invention, a shape of the insertion opening 26-3 are simplified, which makes a molding process of the portion to become simple.

In another embodiment shown in FIGS. 10 and 11, the upper support plate 33 of the heat exchanging section 27 has the same thickness as the tank 28 in the direction of the flow of the air contacting with the heater core section 27. However, the thickness of the bottom support plate 33' is reduced as shown in FIG. 11.

In still another embodiment, shown in FIGS. 12 and 13, the top support plates 33 have the same width which is the same as that of the tanks 28. Furthermore, the heater core 20 has a rectangular cross sectional shape which is almost equal to an inner cross sectional shape of the mounting sections 26-3 and 26-4 of the casing 26, such that the heater core 20 is press fitted to the mounting sections 26-3 and 26-4 without the intervention of any sealing members 39 and 40 between the heater core 20 and the casing 26 as is the case in the first embodiment in FIG. 9.

Figure 14:
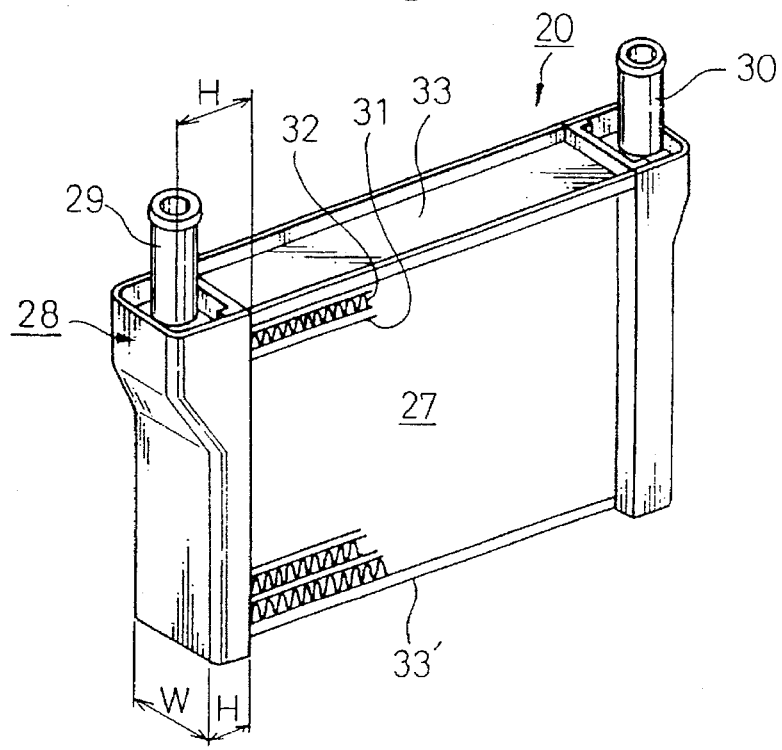
FIG. 14 is similar to FIG. 12 but illustrates a modification.

FIG. 14 shows a further embodiment of the present invention, wherein the thickness W of the tank 28 in a direction transverse to the heater core 20 is constant along the length of the tank 28, while the thickness H of the tank 28 in a direction along the length of the heater core 20 is varied so that the value of the thickness H is reduced at the bottom portion of the tank 28. The tank 28 has the increased thickness H at the top thereof, so that the inlet and outlet pipes 29 and 30 are connected to the tanks 28. In this case, when the tank portions 28 are stored in the casing section 26, so that the air flow in the air duct 10 can contact with the tank portions 28. However, heat exchange does not occur at the tanks 28 but at the heat exchanging section 27. Thus, a contact of the air flow with the tanks 28 is not necessary from the view port of the heat exchange operation. Thus, larger the width H of the heater core 20, i.e., the dimension K in FIG. 15, heat exchanging capacity per the dimension of the heater core is reduced. A construction with the reduced dimension H of the tank in the direction of the length of the heater core is thus effective to reduce the dimension of the heater core 20 while maintaining the heat exchanging capacity 20 unchanged, which makes it easy for the heater core 20 mounted in a limited available space in an automobile.

Figure 15:
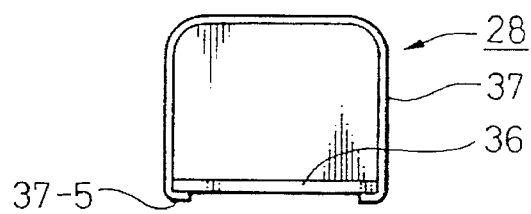
FIG. 15 is a cross sectional view of a modification to a tank.

FIG. 15 is a modification of a construction of a tank 28, wherein the seat plate 36 is of a plain sheet inserted into a tank cap 37 of U-cross sectional shape. The tank cap 37 is formed with a pair of spaced flanges 37-5, to which the seat late is connected by means of a suitable means.

Figure 16:
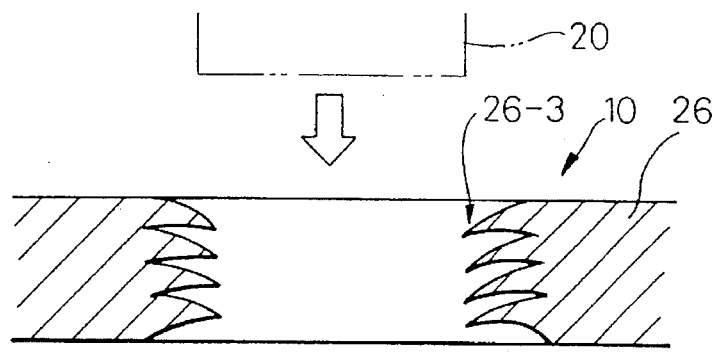
FIG. 16 is a cross sectional view of a modification to a heater core insertion opening.

In a modification in FIG. 16, the insertion opening 26-3 of the mounting section 26 of the casing 10 has at an inner surface thereof a plurality of needle shaped portions. An insertion of a heater core in a direction as shown by an arrow allows the needle shaped portions 26-3 to be elastically deformed, thereby generating a resilient force which opposes the insertion of the heater core. As a result, a firmly contacted condition is obtained between of the casing 10 and the heater core 20, thereby obtaining an increase sealing performance.

Figure 17:
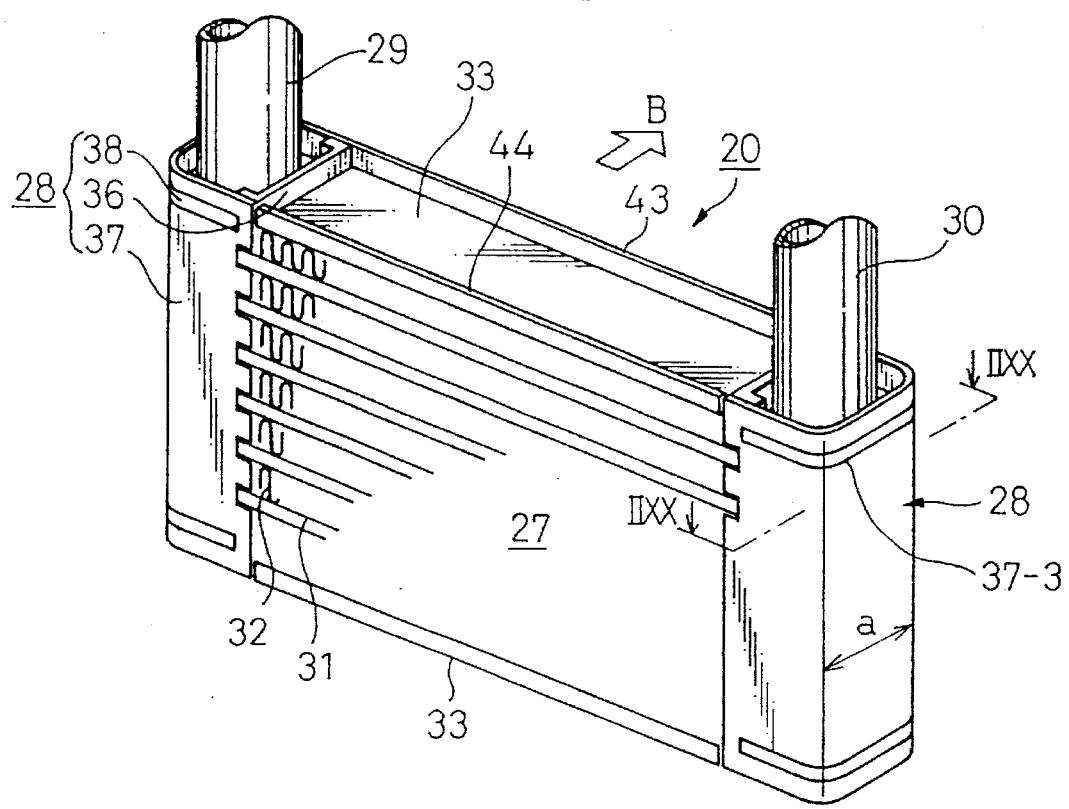
FIG. 17 is a perspective view of a heater core in a further embodiment.
Figure 18:
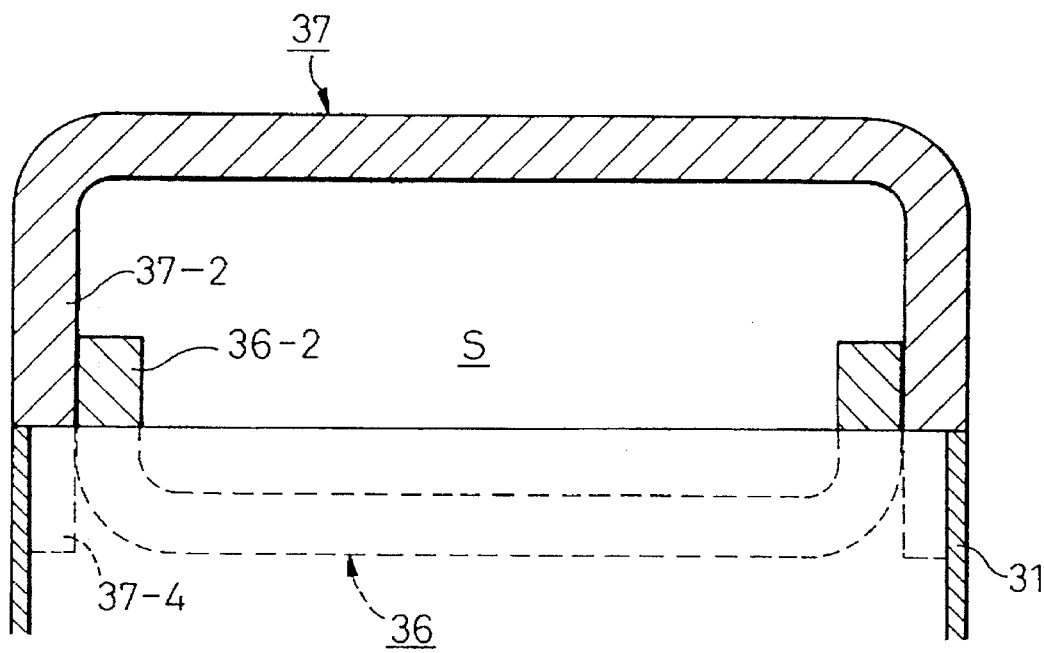
FIG. 18 is a cross sectional view taken along line IIXX—IIXX in FIG. 17.
Figure 19:
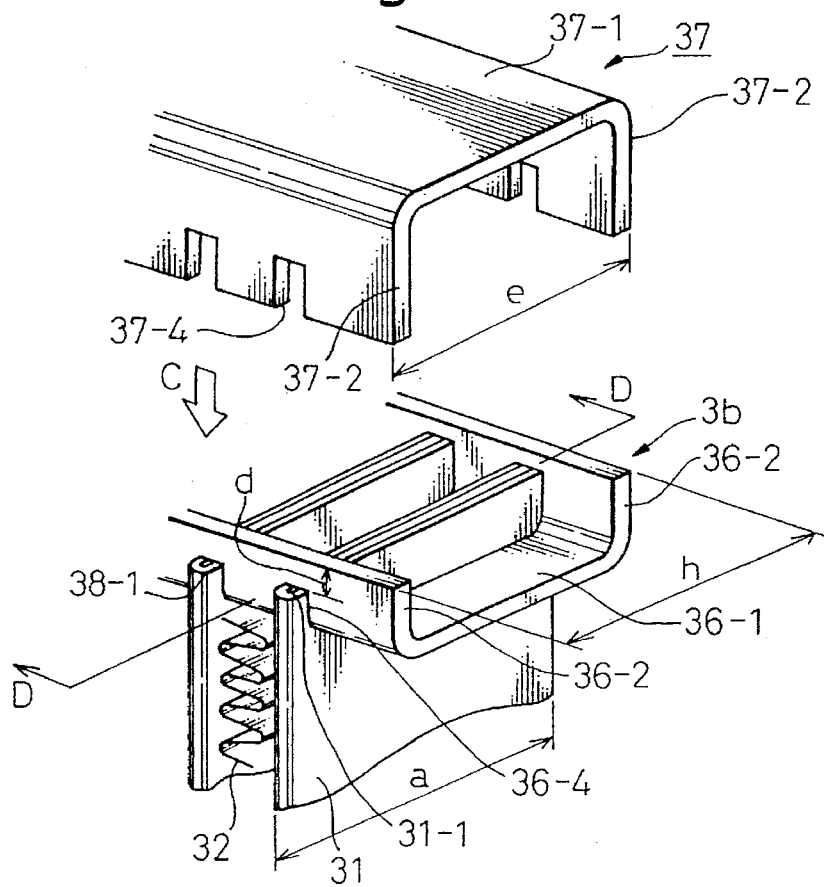
FIG. 19 is a partial perspective view of a tank before assembly.

In an embodiment in FIGS. 17 to 19, in addition to the top and bottom support plates 33, the heat exchanging tubes 31 are widened. In other words, the heat exchanging tube 31 and he fins 32 have, also, the same width as the width of the tank in a direction of the flow of the air passing through the heater core section 27 as shown by an arrow $\underline{B}$. In other words, in a direction of the flow of the air as shown by the arrow $\underline{B}$ in FIG. 17, the tubes 31, the fins 32 and the support plates 33 from spaced flat planes extending vertically. As shown in FIG. 19, the tanks 28 have a thickness $\underline{e}$ in the direction of the air flow, which is the same as the value of the width $\underline{a}$ of the heat exchanging pipe 31. As similar to the first embodiment, each of the tanks 28 is constructed by a seat plate 36, to which a stack of the heat exchanging tubes 31 are connected, a tank cap 37, to which the seat plate 36 is fitted, and a pair of end plates 38 spaced in the direction of the stack. The inlet pipe 29 and the outlet pipe 30 are connected to the respective upper end plates 38 of the tanks 28. As shown in FIG. 19, the seat plate 36 of a substantiality U-cross sectional shape includes a bottom plate portion 36-1 extending along its length and a pair of spaced upright side wall portions 36-2, between which the bottom plate portion 36-1 extends horizontally. The tank cap 37 is also of a substantiality U-cross sectional shape and includes a top plate portion 37-1 and a pair of spaced upright side wall portions 37-2 between which the top plate portion 37-1 extends.

As similar to the first embodiment, in order to assembly the tank 28, the seat plate 36 is fitted to the tank cap 37 in such a manner that the U-shaped recesses face each other, thereby forming a space S (FIG. 18) between the members 28 and 30, so that the side walls 36-2 and 37-2 are in contact with each other. Furthermore, the support plates 33 are fitted to the slits 37-3 at tope and bottom ends of the tanks, thereby obtaining the tank 28 as assembled. In this assembled condition, the space $\underline{S}$ is closed at its top and bottom by the end plates 38, thereby allowing the hot water to be held in the space $\underline{S}$.

As shown in FIG. 19, the seat plate 36 is formed with a plurality of slits (tube insertion openings) 36-4 spaced along the length of the seat plate 36. The spacing between the slits 36-4 corresponds to the spacing between heat exchanging tubes 31. Each slit 36-4 extends along the entire width of the bottom plate portion 36-1 and a extends partially to the side wall portions 36-2 in such a manner that portions of a length $\underline{d}$ free from the slit is created in the side walls 36-2. The flattened heat exchanging tubes 31 are inserted to the respective slits 36-4.

In order to assemble the heater core in the embodiment in FIGS. 17 to 19, the top and bottom end plates 33 are inserted to the respective slits in the seat plate 36 as in the first embodiment explained with reference to FIGS. 4 to 7. The flattened tubes 31 are at their ends inserted to the slits 36-4 in the seat plate 36 as shown in FIG. 19. In this condition, the heat exchanging tubes 31 are projected out of the each of the side walls 36-2 of the seat plate 36 for a length corresponding to the thickness of the side wall 37-2 of the tank cap 37 as shown in FIG. 19. Then, the tank cap 37 is fitted to the seat plate 36 in a direction as shown by an arrow C in FIG. 19, in such a manner that the slits 37-4 at the side walls 37-2 of the tank cap 37 are engaged with the portions of the heat exchanging tubes 31 projected out of the side plates 36-2 of the seat plate 36. As a result, a construction is obtained wherein with respect to the side surface of the tanks 28, not only the side plates 43 and 44 of the top and bottom supporting plates 43 and 44 but also edges of the heat exchanging tubes 31 spaced in the direction of the flow of the air contacted wit the heater core are located on the same vertical plane. As similar to the first embodiment, the end plates 38 are fitted to the respective slits 37-3 on the tank cap 37 38, and the pipes 28 and 30 are fitted to the corresponding top end plates 38 of the respective tanks 28.

In the embodiment in FIGS. 17 to 19, not only the side walls 43 and 44 of the supporting plates 33 but also the side edges of the heat exchanging tubes 31 are located on straight lines with respect to the side walls of the tank caps 37 spaced in the direction of the flow of the air contacting the heater core 20. In other words, the side walls 43 and 44 of the supporting plates 33, the side edges of the heat exchanging tubes 31 and the side walls of the tank caps 37 form straight planes. As a result, when the heater core 20 is inserted to the casing as explained with reference to the first embodiment with reference to FIG. 3, a sealed contact condition is obtained between the heater core 20 and the casing, while the heat exchanging area is increased, thereby obtaining the maximum amount of the heat exchanging efficiency.

FIG. 20 shows a modification, where the tank 28 is constructed by a single plate 90 which forms a closed U-cross sectional shape and defines overlapped longitudinal ends 90-1 and 90-2, which are connected with each other by means of a suitable means such as welding. The plate 90 is, as in the embodiment in FIG. 20, formed with slits 90-1, to which ends of respective heat exchanging tubes 28 are inserted. The remaining construction of the modification is the same as that explained with reference to FIGS. 17 to 19.

We claim:
1. A heat exchanging system comprising:
   a casing defining a passageway for a flow of air and an opening opened laterally with respect to the passageway, and;
   a heat exchanger for receiving therein a heat exchanging medium, the heat exchanger inserted into the casing via said opening to a position where the air flow is contacted wit the heat exchanger, which allows heat exchange to occur between the heat exchanging medium and the air flow in the duct;

the heat exchanger comprising a pair of spaced apart tanks a stack of heat exchanging tubes and fins arranged alternately, and support plates at the top and bottom of the stack;

said tanks as well as said top support plate being under a closely sealed relationship with respect to the opening, while the casing has a portion for firmly fixing said bottom support plate;

said tanks and at the top of support plate, have portions which form a pair of straight lines extending in the direction of the length of the tube and spaced in the direction of the flow of the air in the passageway.

2. A system according to claim 1, wherein the tanks and the support plates of the heat exchanger form an outer cross sectional shape which is similar to and smaller than the cross sectional shape of said opening so as to provide annular gap between the opening and the heat exchanger, and the system is further provided with a seal member filling said annular space.

3. An air conditioning system according to claim 1, wherein the tanks and the support plates of the heat exchanger form an outer cross-sectional shape which is substantially identical to a cross sectional shape of the opening, and the heat exchanger is under a press fitted condition to said opening thereby providing a sealed structure.

4. A system according to claim 1, wherein the cross-sectional shape of the opening and the outer closed shape of the heat exchanger are of substantially rectangular shape eleongated along a direction transverse to the flow of the air.

5. A system according to claim 1, wherein said tank comprises a seat plate substantially extending in a direction of the stack having an outer surface which is under a sealed relationship with respect to an inner periphery of said opening, a cap of substantially U-shape extending in a direction of the stack, the seat plate and the cap being connected with each other so as to form a chamber therebetween, and end plates at ends of the chamber thereby closing the chamber, said seat plate having a plurality of slits spaced in parallel along the length of the tank for receiving the respective ends of the heat exchanging tubes.

6. A system according to claim 1, wherein said supporting plate comprises a base plate portion extending along the length of the tube, and a pair of side wall portions between which the base plate portion is arranged, said straight line being in part formed by the side wall portions.

7. A system according to claim 1, wherein said heat exchanging tube has a width which is substantially the same as that of portion of the tank in the direction of the flow of the air, and wherein the tank forms slits extending along the entire width of the tank, the slits having a pair of abutting surfaces, to which a corresponding end of the tube contacts, thereby obtaining a sealed connection of the tube with respect to the corresponding slit.

8. A system according to claim 1, wherein said tanks and the bottom support plate, have portions which also form a pair of straight lines extending in the direction of the length of the tube and are spaced in the direction of the flow of the air in the passageway.

9. A heat exchanging system comprising:

a casing defining a passageway for a flow of air and an opening opened laterally with respect to the passageway, and;

a heat exchanger for receiving therein a heat exchanging medium, the heat exchanger inserted into the casing via said opening to a position where the air flow is contacted wit the heat exchanger, which allows heat exchange to occur between the heat exchanging medium and the air flow in the duct;

the heat exchanger comprising a pair of spaced apart tanks, a stack of heat exchanging tubes and fins arranged alternately, and support plates at the top and bottom of the stack;

said tanks as well as said top support plate being under a closely sealed relationship with respect to the opening, while the casing has a portion for firmly fixing said bottom support plate;

each of said support plates forming a pair of straight end surfaces extending parallel along the length of the tubes and spaced in the direction of the flow of the air in the passageway;

said straight end surfaces of at least the top support plate being located on the same plane with respect to respective surfaces of the tanks spaced in the direction of the flow of the air in the passageway.

10. A system according to claim 9, wherein said straight end surfaces of the support plate, at the bottom, being also located on the same plane with respect to respective surfaces of the tanks.

11. A heat exchanging system comprising:

a casing defining a passageway for a flow of air and an opening opened laterally with respect to the passageway, and;

a heat exchanger for receiving therein a heat exchanging medium, the heat exchanger inserted into the casing via said opening to a position where the air flow is contacted with the heat exchanger, which allows heat exchange to occur between the heat exchanging medium and the air flow in the duct;

the heat exchanger comprising a pair of spaced apart tanks, a stack of heat exchanging tubes and fins arranged alternatively, and support plates at the top and bottom of the stack;

said tanks as well as said top support plate being under a closely sealed relationship with respect to the opening, while the casing having a portion for firmly fixing said bottom support plate;

each of said support plates forming a pair of straight ends surfaces extending parallel along the length of the tubes and spaced in the direction of the flow of the air in the passageway;

said heat exchanging tube having a width which is substantially the same as that of a portion of the tank in the direction of the flow of the air;

said straight end surfaces of the support plate at the top and bottom, edges of the heat exchanging tubes and the heat exchanging fins being located on the same vertical planes with respect to respective surfaces of the tanks spaced in the direction of the flow of the air in the passageway.

12. A heat exchanging system for a cabin of a automobile having a water cooled internal combustion engine, comprising:

a duct defining a passageway having a first end of introducing an air and a second end opened to the cabin for discharging the air;

the duct having an opening opened laterally to the passageway, and;

a heat exchanger for receiving therein the engine cooling water, the heat exchanger inserted into the casing via said opening to a position where the air flow is contacted with the heat exchanger, which allows heat exchanger to occur between the engine cooling water and the air flow in the duct;

the heat exchanger comprising a pair of spaced apart tanks, a stack of heat exchanging tubes and fins arranged alternately, and support plates at the top and bottom of the stack;

said tanks as well as said top support plate being under a closely sealed relationship with respect to the opening, while the casing has a portion for firmly fixing said bottom support plate;

said tanks and at least the top support plate have portions which form a pair of straight lines extending in the direction of the length of the tube and spaced in the direction of the flow of the air in the passageway.

* * * * *